(12) United States Patent
Zhang et al.

(10) Patent No.: US 12,250,727 B2
(45) Date of Patent: Mar. 11, 2025

(54) METHOD AND APPARATUS RELATED TO RADIO NETWORK TEMPORARY IDENTIFIER

(71) Applicant: ZTE CORPORATION, Guangdong (CN)

(72) Inventors: Li Zhang, Shenzhen (CN); Ziyang Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 331 days.

(21) Appl. No.: 17/852,269

(22) Filed: Jun. 28, 2022

(65) Prior Publication Data

US 2022/0369380 A1  Nov. 17, 2022

Related U.S. Application Data

(63) Continuation of application No. PCT/CN2020/110933, filed on Aug. 25, 2020.

(51) Int. Cl.
*H04W 74/08* (2024.01)
*H04W 72/04* (2023.01)
*H04W 72/0453* (2023.01)
*H04W 74/0808* (2024.01)
*H04W 74/0833* (2024.01)

(52) U.S. Cl.
CPC ... *H04W 74/0833* (2013.01); *H04W 72/0453* (2013.01); *H04W 74/0808* (2013.01)

(58) Field of Classification Search
CPC ........... H04W 74/0833; H04W 74/002; H04W 72/0453; H04W 72/0446
See application file for complete search history.

(56) References Cited

U.S. PATENT DOCUMENTS

| | | | | |
|---|---|---|---|---|
| 11,246,160 B2* | 2/2022 | Li | ........................... | H04W 80/08 |
| 11,596,001 B2* | 2/2023 | Zhang | ................. | H04W 74/002 |
| 2018/0359784 A1* | 12/2018 | Agiwal | ............. | H04W 72/0446 |
| 2021/0037484 A1* | 2/2021 | Zhou | ................... | H04W 52/325 |
| 2021/0144742 A1* | 5/2021 | Jeon | ......................... | H04L 41/06 |
| 2021/0360711 A1* | 11/2021 | Mo | ................... | H04W 74/0833 |
| 2021/0410191 A1* | 12/2021 | Wu | ................... | H04W 74/0833 |
| 2022/0174744 A1* | 6/2022 | Lin | ......................... | H04W 8/26 |

FOREIGN PATENT DOCUMENTS

| | | |
|---|---|---|
| CN | 110381568 A | 10/2019 |
| CN | 110536441 A | 12/2019 |
| CN | 110636613 A | 12/2019 |
| JP | 2020-053849 A | 4/2020 |
| WO | WO-2019/235897 A1 | 12/2019 |

(Continued)

OTHER PUBLICATIONS

Mediatek Inc., "Remaining details on RACH procedure", 3GPP TSG RAN WG1 Meeting 90bis, R1-1718340, Prague, CZ, Oct. 13, 2017 (11 pages).

(Continued)

*Primary Examiner* — Rasheed Gidado
(74) *Attorney, Agent, or Firm* — Foley & Lardner LLP

(57) ABSTRACT

Presented are systems and methods for radio network temporary identifier (RNTI). A wireless communication device may determine a RNTI. The wireless communication device may determine that a cyclic redundancy check (CRC) of a downlink control information (DCI) format is scrambled with the RNTI.

16 Claims, 5 Drawing Sheets

(56) References Cited

FOREIGN PATENT DOCUMENTS

| | | |
|---|---|---|
| WO | WO-2020/017240 A1 | 1/2020 |
| WO | WO-2020/066854 A1 | 4/2020 |
| WO | WO-2020/134809 A1 | 7/2020 |
| WO | WO-2020/167083 A1 | 8/2020 |

OTHER PUBLICATIONS

Notice of Reasons for Rejection for JP Appl. No. 2022-540392, dated Sep. 25, 2023 (with English translation, 11 pages).
International Search Report and Written Opinion for PCT Appl. No. PCT/CN2020/110933, dated Apr. 27, 2021 (9 pages).
Qualcomm Incorporated: "TP for SFN validation for DCI 1_0 with RA-RNTI and msgB-RNTI" 1 3GPP TSG RAN WG1 Meeting #100bis-e; R1-200xxxx; Apr. 30, 2020; Online (18 pages).
Extended European Search Report for EP Appl. No. 20950570.0, dated Dec. 12, 2022 (6 pages).
First Office Action for CN App. No. 202080103395.1 dated Mar. 14, 2024 (with English translation, 19 pages).

\* cited by examiner

| PRACH Config. Index | Preamble format | $n_{SFN}\ mod\ x = y$ | | Slot number | Starting symbol | Number of PRACH slots within a 60 kHz slot | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 26 | A1 | 1 | 0 | 3,7,11,15,19,23,27, 31,35,39 | 0 | 1 | 6 | 2 |

METHOD AND APPARATUS RELATED TO RADIO NETWORK TEMPORARY IDENTIFIER

CROSS-REFERENCE TO RELATED APPLICATION

This application claims the benefit of priority under 35 U.S.C. § 120 as a continuation of PCT Patent Application No. PCT/CN2020/110933, filed on Aug. 25, 2020, the disclosure of which is incorporated herein by reference in its entirety.

TECHNICAL FIELD

The disclosure relates generally to wireless communications, including but not limited to systems and methods for radio network temporary identifier (RNTI).

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may calculate, compute or otherwise determine a RNTI (e.g., a RNTI value). The wireless communication device may determine, detect or confirm that a cyclic redundancy check (CRC) of a downlink control information (DCI) format is scrambled with the RNTI.

In some embodiments, a random access response may indicate a successful reception. In some embodiments, the random access response may indicate a successful reception when the CRC of the DCI format is scrambled with the RNTI. In some embodiments, a random access preamble identifier in a medium access control (MAC) protocol data unit (PDU) may be included. In some embodiments, the random access response may indicate a successful reception when the random access preamble identifier in the first MAC PDU corresponds to a transmitted preamble index. In some embodiments, the random access response may indicate a successful reception when a user equipment (UE) contention resolution identity in a MAC sub-PDU matches a common control channel (CCCH) service data unit (SDU).

In some embodiments, the wireless communication device may receive an indication and an identifier from a wireless communication node via a message. In some embodiments, the indication may comprise an indication of an index of a physical random access channel (PRACH) occasion in frequency domain (f_id). In some embodiments, the identifier may comprise an identifier of a carrier for random access preamble transmission (ul_carrier_id). In some embodiments, the indication and the identifier may correspond to a frequency domain resource of a transmitting preamble. In some embodiments, the wireless communication device may determine the RNTI. In some embodiments, the RNTI may be a function of an index of a first orthogonal frequency division multiplexing (OFDM) symbol of the PRACH occasion (s_id), and an index of a first slot of the PRACH occasion (t_id). In some embodiments, the RNTI may exclude f_id and ul_carrier_id.

In some embodiments, the wireless communication device may receive an indication and an identifier from a wireless communication node via a message. In some embodiments, the indication may comprise an indication of an index of a physical random access channel (PRACH) occasion in frequency domain (f_id). In some embodiments, the identifier may comprise an identifier of a carrier for random access preamble transmission (ul_carrier_id). In some embodiments, the indication and the identifier may correspond to a frequency domain resource of a transmitting preamble. In some embodiments, the wireless communication device may determine the RNTI. In some embodiments, the RNTI may be a function of an index of the PRACH occasion in time domain (t_RO_id). In some embodiments, the RNTI may exclude (e.g., is not a function of, or is not determined according to) f_id and ul_carrier_id.

In some embodiments, the wireless communication device may receive an indication and an index from a wireless communication node via a message. In some embodiments, the indication may comprise an indication of an index of a first orthogonal frequency division multiplexing (OFDM) symbol of the PRACH occasion (s_id). In some embodiments, the index may comprise an index of a first slot of the PRACH occasion (t_id) corresponding to a time domain resource of a transmitting preamble. In some embodiments, the wireless communication device may determine the RNTI. In some embodiments, the RNTI may be a function of an index of a physical random access channel (PRACH) occasion in frequency domain (f_id) and an identifier of a carrier (e.g., uplink carrier) for random access preamble transmission (ul_carrier_id). In some embodiments, the RNTI may exclude s_id and t_id.

In some embodiments, the wireless communication device may receive an indication from a wireless communication node via a message. In some embodiments, the indication may comprise an indication of an index of a PRACH occasion in time domain (t_RO_id). In some embodiments, the indication may correspond to a time domain resource of a transmitting preamble. In some embodiments, the wireless communication device may determine the RNTI. In some embodiments, the RNTI may be a function of an index of a physical random access channel (PRACH) occasion in frequency domain (f_id) and an identifier of a carrier for random access preamble transmission (ul_carrier_id). In some embodiments, the RNTI may exclude (e.g., is not a function of, or is not determined using) t_RO_id.

In some embodiments, the wireless communication device may determine (e.g., compute or calculate a value for) the RNTI. In some embodiments, the RNTI may be a function of a time domain index, a number, a frequency domain index, and an identifier. In some embodiments, the time domain index may comprise an index of a PRACH occasion in time domain (t_RO_id). In some embodiments, the number may comprise a total number of PRACH occasions in the time domain (t_RO_total). In some embodiments, the frequency domain index may comprise an index of a physical random access channel (PRACH) occasion in frequency domain (f_id). In some embodiments, the identifier may comprise an identifier of a carrier for random access preamble transmission (ul_carrier_id).

In some embodiments, the wireless communication device may determine the RNTI. In some embodiments, the RNTI may be a function of an indication, a time domain index, a frequency domain index, and an identifier. In some embodiments, the indication may comprise an indication of an index of a first orthogonal frequency division multiplexing (OFDM) symbol of the PRACH occasion (s_id). In some embodiments, the time domain index may comprise an index of a first slot of the PRACH occasion (t_id) corresponding to a time domain resource of a transmitting preamble. In some embodiments, the frequency domain index may comprise an index of a physical random access channel (PRACH) occasion in frequency domain (f_id). In some embodiments, the identifier may comprise an identifier of a carrier for random access preamble transmission (ul_carrier_id). In some embodiments, the wireless communication device may send an indication to a wireless communication node via message. In some embodiments, the indication may comprise an indication of a group of slots to which the RNTI belongs.

At least one aspect is directed to a system, method, apparatus, or a computer-readable medium. A wireless communication node may determine a RNTI. A wireless communication device may determine the RNTI. The wireless communication device may determine that a cyclic redundancy check (CRC) of a downlink control information (DCI) format is scrambled with the RNTI.

In some embodiments, a random access response may indicate a successful reception. In some embodiments, the random access response may indicate a successful reception when the CRC of the DCI format is scrambled with the RNTI. In some embodiments, a random access preamble identifier in a medium access control (MAC) protocol data unit (PDU) may be included. In some embodiments, the random access response may indicate a successful reception when the random access preamble identifier in the first MAC PDU corresponds to a transmitted preamble index. In some embodiments, the random access response may indicate a successful reception when a user equipment (UE) contention resolution identity in a MAC sub-PDU matches a common control channel (CCCH) service data unit (SDU).

In some embodiments, the wireless communication node may send an indication and an identifier to the wireless communication device via a message. In some embodiments, the indication may comprise an indication of an index of a physical random access channel (PRACH) occasion in frequency domain (f_id). In some embodiments, the identifier may comprise an identifier of a carrier for random access preamble transmission (ul_carrier_id). In some embodiments, the indication and the identifier may correspond to a frequency domain resource of a transmitting preamble. In some embodiments, the wireless communication node may determine the RNTI. In some embodiments, the RNTI may be a function of an index of a first orthogonal frequency division multiplexing (OFDM) symbol of the PRACH occasion (s_id), and an index of a first slot of the PRACH occasion (t_id). In some embodiments, the RNTI may exclude (e.g., is not a function of, or is not determined using) f_id and ul_carrier_id.

In some embodiments, the wireless communication node may send an indication and an identifier to the wireless communication device via a message. In some embodiments, the indication may comprise an indication of an index of a physical random access channel (PRACH) occasion in frequency domain (f_id). In some embodiments, the identifier may comprise an identifier of a carrier for random access preamble transmission (ul_carrier_id). In some embodiments, the indication and the identifier may correspond to a frequency domain resource of a transmitting preamble. In some embodiments, the wireless communication node may determine the RNTI. In some embodiments, the RNTI may be a function of an index of the PRACH occasion in time domain (t_RO_id). In some embodiments, the RNTI may exclude (e.g., is not a function of, or is not determined using) f_id and ul_carrier_id.

In some embodiments, the wireless communication node may send an indication and an index to the wireless communication device via a message. In some embodiments, the indication may comprise an indication of an index of a first orthogonal frequency division multiplexing (OFDM) symbol of the PRACH occasion (s_id). In some embodiments, the index may comprise an index of a first slot of the PRACH occasion (t_id) corresponding to a time domain resource of a transmitting preamble. In some embodiments, the wireless communication node may determine the RNTI. In some embodiments, the RNTI may be a function of an index of a physical random access channel (PRACH) occasion in frequency domain (f_id) and an identifier of a carrier for random access preamble transmission (ul_carrier_id). In some embodiments, the RNTI may exclude (e.g., is not a function of, or is not determined according to) s_id and t_id.

In some embodiments, the wireless communication node may send an indication to the wireless communication device via a message. In some embodiments, the indication may comprise an indication of an index of a PRACH occasion in time domain (t_RO_id). In some embodiments, the indication may correspond to a time domain resource of a transmitting preamble. In some embodiments, the wireless communication node may determine the RNTI. In some embodiments, the RNTI may be a function of an index of a physical random access channel (PRACH) occasion in frequency domain (f_id) and an identifier of a carrier for random access preamble transmission (ul_carrier_id). In some embodiments, the RNTI may exclude (e.g., is not a function of, or is not determined using) t_RO_id.

In some embodiments, the wireless communication node may determine the RNTI. In some embodiments, the RNTI may be a function of a time domain index, a number, a frequency domain index, and an identifier. In some embodiments, the time domain index may comprise an index of a PRACH occasion in time domain (t_RO_id). In some embodiments, the number may comprise a total number of PRACH occasions in the time domain (t_RO_total). In some embodiments, the frequency domain index may comprise an index of a physical random access channel (PRACH) occasion in frequency domain (f_id). In some embodiments, the identifier may comprise an identifier of a carrier for random access preamble transmission (ul_carrier_id).

In some embodiments, the wireless communication node may determine the RNTI. In some embodiments, the RNTI may be a function of an indication, a time domain index, a frequency domain index, and an identifier. In some embodiments, the indication may comprise an indication of an index of a first orthogonal frequency division multiplexing (OFDM) symbol of the PRACH occasion (s_id). In some embodiments, the time domain index may comprise an index of a first slot of the PRACH occasion (t_id) corresponding to a time domain resource of a transmitting preamble. In some embodiments, the frequency domain index may comprise an index of a physical random access channel (PRACH) occasion in frequency domain (f_id). In some embodiments, the identifier may comprise an identifier of a carrier for random access preamble transmission (ul_carrier_id). In some embodiments, the wireless communication node may receive an indication from the wireless communication device via message. In some embodiments, the indication may comprise an indication of a group of slots to which the RNTI belongs.

In some embodiments, a random access radio network temporary identifier (RA-RNTI) formula may include one or more time domain resources of a transmitting preamble (or other transmissions that initiate synchronization/communication with a wireless communication node). In some embodiments, the RA-RNTI formula may include one or more frequency domain resources of a transmitting preamble. In some embodiments, the time domain and frequency domain resources may be decoupled/separated to reduce/decrease/minimize/control/limit the range of the RA-RNTI. At least one of the following approaches may reduce/limit the range of the RA-RNTI.

Approach 1: The RA-RNTI may indicate/specify/provide one or more time domain resources of the transmitting preamble (e.g., t_id, s_id, and/or other time domain resources). A random access response (RAR) and/or downlink control information (DCI) may indicate/specify/provide one or more frequency domain resources of the transmitting preamble (e.g., f_id, ul_carrier_id, and/or other frequency domain resources). A current sub-carrier spacing (SCS) may hold a relationship with the range of the t_id. For example, if a SCS of 960 kHz is used, the maximum value of the t_id may correspond to 640. A wireless communication device (e.g., a UE, a terminal, or a served node) may receive/obtain at least one indication and/or identifier corresponding/associated/related to the frequency domain resources. For example, the wireless communication device may receive/obtain the f_id and/or the ul_carrier_id. In some embodiments, 4 bits (or other numbers of bits) may indicate/specify the one or more frequency domain resources.

Approach 2: The RA-RNTI may indicate/specify/provide one or more time domain resources of the transmitting preamble. The RAR and/or DCI may indicate/specify/provide one or more frequency domain resources of the transmitting preamble. The one or more time domain resources may comprise an index of the PRACH occasion in time domain (t_RO_id). The time domain resources may use/employ a random access channel (RACH) occasion (RO) index in a system frame. The wireless communication device may receive/obtain at least one indication and/or identifier corresponding to the frequency domain resources. For example, the wireless communication device may receive/obtain the f_id and/or the ul_carrier_id. In some embodiments, 4 bits (or other numbers of bits) may indicate/specify the one or more frequency domain resources.

Approach 3: The RA-RNTI may indicate/specify/provide one or more frequency domain resources of the transmitting preamble. The RAR and/or DCI may indicate one or more time domain resources of the transmitting preamble. The one or more time domain resources may indicate/provide/comprise a starting position of a symbol and/or a slot of a transmitting preamble. The starting position of a symbol may comprise an index of a first orthogonal frequency division multiplexing (OFDM) symbol of the physical random access channel (PRACH) occasion (s_id). The slot may comprise an index of a first slot of the PRACH occasion (t_id). If a SCS of 1,920 kHz is used, at least 15 bits may be used to indicate or provide the time domain resources.

Approach 4: The RA-RNTI may indicate/specify/provide one or more frequency domain resources of the transmitting preamble. The RAR and/or DCI may indicate one or more time domain resources of the transmitting preamble. In some embodiments, the RAR and/or DCI may indicate the RO index in a system frame. In certain PRACH configurations (e.g., configuration specified by TS 38.211), the maximum number of PRACH occasions may correspond to 70 (e.g., at least 7 bits may be used).

According to certain embodiments of the RA-RNTI formula, the wireless communication device and/or node may calculate the RA-RNTI using the granularity of the time domain symbols in a frame. The time domain symbols may change in value according to the value of the SCSs. For example, the time domain symbols may increase/increment in value with a higher value of SCSs (e.g., 1,920 kHz or other frequencies). In certain specifications, each PRACH configuration index (e.g., PRACH configuration index specified in Table 6.3.3.2-2 Table 6.3.3.2-4 in clause 6.3.3.2 in TS 38.211) may correspond to a limited number of PRACH occasions in the time domain. Therefore, one or more PRACH occasion indices may replace/substitute one or more time domain resources in the system frame.

In some embodiments, the RA-RNTI formula may remain unchanged/unaltered. The RA-RNTI may indicate/specify at least 80 (or 160) slots according to certain specifications. In some embodiments, an extended/incremented/increased SCS may have a value that is a multiple of 120 kHz. Therefore, an extended SCS may result in a slot number that is a multiple of 80 or 160 slots. The wireless communication device may specify/indicate the group of slots (e.g., group of 80 and/or 160 slots) to which the RNTI belongs. The wireless communication device may specify the group of slots using a RAR and/or DCI (or other messages).

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 3 illustrates a table for random access configurations for certain frequency ranges and/or an unpaired spectrum, in accordance with some embodiments of the present disclosure;

DETAILED DESCRIPTION

Figure 1:
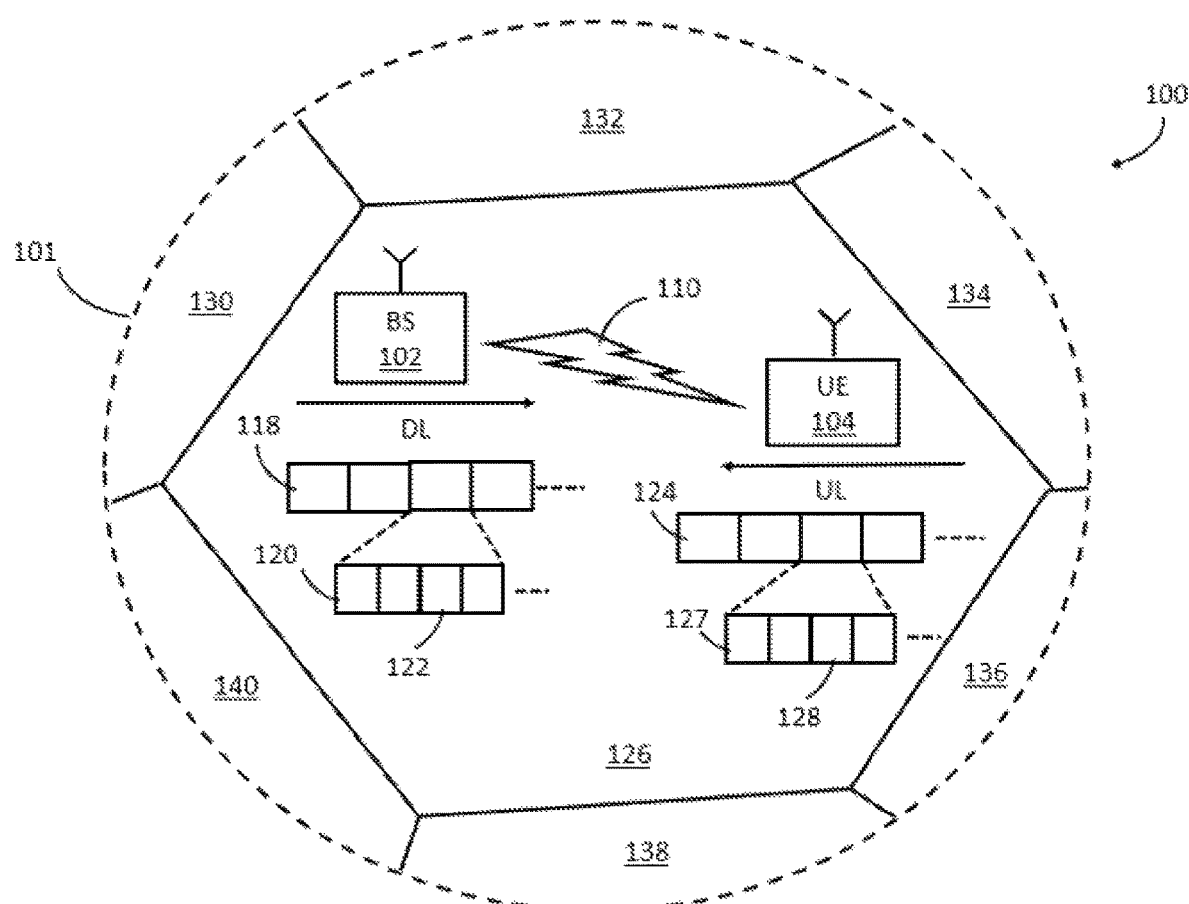
FIG. 1 illustrates an example cellular communication network in which techniques disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
| --- | --- |
| 3GPP | 3rd Generation Partnership Project |
| 5G | 5th Generation Mobile Networks |
| 5G-AN | 5G Access Network |
| 5GgNB | Next Generation NodeB |
| 5G-GUTI 5G- | Globally Unique Temporary UE Identify |
| AF | Application Function |
| AMF | Access and Mobility Management Function |
| AN | Access Network |
| ARP | Allocation and Retention Priority |
| CA | Carrier Aggregation |
| CM | Connected Mode |
| CMR | Channel Measurement Resource |
| CSI | Channel State Information |
| CQI | Channel Quality Indicator |
| CSI-RS | Channel State Information Reference Signal |
| CRI | CSI-RS Resource Indicator |
| CSS | Common Search Space |
| DAI | Downlink Assignment Index |
| DCI | Downlink Control Information |
| DL | Down Link or Downlink |
| DN | Data Network |
| DNN | Data Network Name |
| ETSI | European Telecommunications Standards Institute |

| Acronym | Full Name |
| --- | --- |
| FR | Frequency range |
| GBR | Guaranteed Bit Rate |
| GFBR | Guaranteed Flow Bit Rate |
| HARQ | Hybrid Automatic Repeat Request |
| MAC-CE | Medium Access Control (MAC) Control Element (CE) |
| MCS | Modulation and Coding Scheme |
| MBR | Maximum Bit Rate |
| MFBR | Maximum Flow Bit Rate |
| NAS | Non-Access Stratum |
| NF | Network Function |
| NG-RAN | Next Generation Node Radio Access Node |
| NR | Next Generation RAN |
| NZP | Non-Zero Power |
| OFDM | Orthogonal Frequency-Division Multiplexing |
| OFDMA | Orthogonal Frequency-Division Multiple Access |
| PCF | Policy Control Function |
| PDCCH | Physical Downlink Control Channel |
| PDSCH | Physical Downlink Shared Channel |
| PDU | Packet Data Unit |
| PUCCH | Physical uplink control channel |
| PMI | Precoding Matrix Indicator |
| PPCH | Physical Broadcast Channel |
| PRI | PUCCH resource indicator |
| QoS | Quality of Service |
| RAN | Radio Access Network |
| RAN CP | Radio Access Network Control Plane |
| RAT | Radio Access Technology |
| RBG | Resource Block Group |
| RRC | Radio Resource Control |
| RV | Redundant Version |
| SM NAS | Session Management Non Access Stratum |
| SMF | Session Management Function |
| SRS | Sounding Reference Signal |
| SS | Synchronization Signal |
| SSB | SS/PBCH Block |
| TB | Transport Block |
| TC | Transmission Configuration |
| TCI | Transmission Configuration Indicator |
| TRP | Transmission/Reception Point |
| UCI | Uplink Control Information |
| UDM | Unified Data Management |
| UDR | Unified Data Repository |
| UE | User Equipment |
| UL | Up Link or Uplink |
| UPF | User Plane Function |
| USS | UE Specific Search Space |

1. Mobile Communication Technology and Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
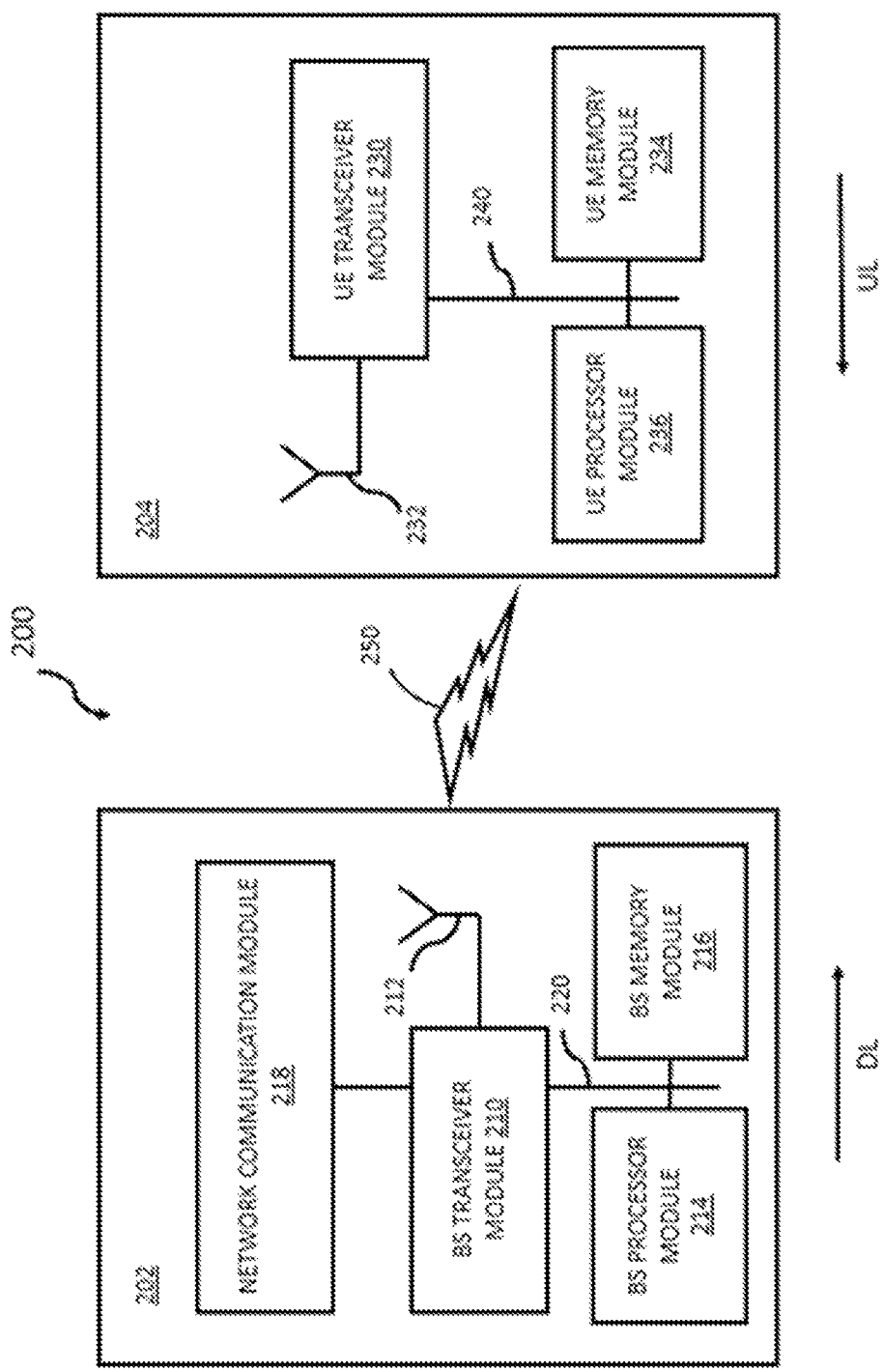
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods Related to Radio Network Temporary Identifier (RNTI).

In certain specifications, the random access radio network temporary identifier (RA-RNTI) may be associated to a physical random access channel (PRACH) occasion. The PRACH occasion may correspond to a PRACH occasion in which a random access preamble is transmitted/sent/broadcasted. A wireless communication device (e.g., a UE, a terminal, or a served node) and/or a wireless communication node (e.g., a ground terminal, a base station, a gNB, an eNB, or a serving node) may compute/calculate/determine the RA-RNTI using the following formula:

$$RA\text{-}RNTI = 1 + s\_id + 14 \times t\_id + 14 \times 80 \times f\_id + 14 \times 80 \times 8 \times ul\_carrier\_id$$

The s_id may correspond/refer to the index of the first orthogonal frequency division multiplexing (OFDM) symbol of the PRACH occasion. The s_id may have a value that is larger than or equal to 0 and less than 14. The t_id may correspond/refer to the index of the first slot of the PRACH occasion in a system frame. The t_id may have a value that is larger than or equal to 0 and less than 80. A value of a parameter μ (e.g., specified in clause 5.3.2 in TS 38.211 [8]) may indicate/influence/determine a subcarrier spacing. The subcarrier spacing may determine/indicate/specify the value of t_id. The f_id may correspond/refer to the index of the PRACH occasion in the frequency domain. The f_id may have a value that is larger than or equal to 0 and less than 8. The ul_carrier_id may correspond/refer to the uplink (UL) carrier used for random access preamble transmissions. The ul_carrier_id may have a value of 0 for a normal uplink (NUL) carrier. The ul_carrier_id may have a value of 1 for a supplementary uplink (SUL) carrier.

A sub-carrier spacing (SCS)'s value may influence/determine the range of the t_id. In a system frame, the maximum value of the t_id may correspond to 79 when the SCS has a value of 120 kHz. As demonstrated by the RA-RNTI formula, the value of the RA-RNTI may be a function of the t_id. For example, the maximum value of the RA-RNTI may correspond to 17,920 (e.g., according to the RA-RNTI formula) if the t_id has a value of 79 (e.g., the SCS has a value of 120 kHz). When the SCS has a value of 480 kHz, the maximum value of the t_id may correspond to 319. Therefore, the maximum value of the RA-RNTI (e.g., the SCS has a value of 480 kHz) may correspond to 71,680 (e.g., the t_id has a value of 319). In certain embodiments, the range of the RNTI may be restricted/limited/bounded to a value that is greater than or equal to 0 and less than or equal to 65,535 (e.g., 0≤RNTI≤65,535). Therefore, if the SCS has a value of 480 kHz (e.g., t_id may have a value of 319), the maximum value of the RA-RNTI may exceed 65,535 (e.g., the upper bound). The systems and methods presented herein include a novel approach for determining (or bounding) the value of the RNTI.

A. Embodiment 1: The RNTI Indicates the Time Domain Resources, and the DCI or RAR Indicate the Frequency Domain Resources In certain specifications, the RA-RNTI may be associated/related to a PRACH occasion. The PRACH occasion may correspond to the PRACH occasion in which the random access preamble is transmitted. The wireless communication device and/or the wireless communication node may compute/calculate/determine the RA-RNTI using the following formula:

$$RA\text{-}RNTI = 1 + s\_id + 14 \times t\_id + 14 \times 80 \times f\_id + 14 \times 80 \times 8 \times ul\_carrier\_id$$

The RA-RNTI formula may include/comprise one or more time domain resources (e.g., one or more parameters associated with one or more time domain resources) of the transmitting preamble (e.g., s_id, t_id, and/or other time domain resource parameters). The RA-RNTI formula may include/comprise one or more frequency domain resources (e.g., one or more parameters associated with one or more frequency domain resources) of the transmitting preamble (e.g., f_id, ul_carrier_id, and/or other frequency domain resource parameters). The one or more time domain resources and the frequency domain resources may be decoupled/separated to reduce/decrease/minimize the range of the RA-RNTI. In some embodiments, the formula that provides/indicates/specifies the value of the RA-RNTI may include the one or more time domain resources. The formula that provides/indicates/specifies the value of the RA-RNTI may exclude (e.g., not involve/consider) the one or more frequency domain resources and/or their associated parameters. The wireless communication network may indicate/provide the frequency domain resources (or their associated parameters) to the wireless communication device. The wireless communication network may use the DCI and/or RAR (or other types of signaling and/or messages) to indicate the parameters associated with the frequency domain resources.

In some embodiments, the RA-RNTI may be a function of parameter(s) associated with or corresponding to the one or more time domain resources (e.g., s_id, t_id, and/or other parameters associated with time domain resources) of the transmitting preamble (e.g., the RA-RNTI may exclude parameter(s) associated with the frequency domain resources). Therefore, the wireless communication device and/or the wireless communication node may compute/calculate/determine the RA-RNTI using the following formula:

$$RA\text{-}RNTI = 1 + s\_id + 14 \times t\_id$$

According to the previous formula, if the SCS has a value of 1,920 kHz, the range of the t_id may be between the values of 0 and 1,279 (e.g., $0 \leq t\_id \leq 1,279$). Therefore, the maximum value of the RA-RNTI may correspond to 17,920, and hence, does not exceed the upper bound (e.g., 65,535).

The wireless communication node may indicate/provide the one or more frequency domain resources of the transmitting preamble (e.g., f_id, ul_carrier_id, and/or other frequency domain resources) to the wireless communication device. The wireless communication node may use the RAR and/or DCI to indicate the one or more frequency domain resources. In certain specifications, the f_id may have a maximum value of 7. Therefore, at least 3 bits (or other numbers of bits) may indicate the f_id. In some embodiments, at least 2 uplink (UL) carriers may be configured for the UL carrier, and hence, at least 1 bit (or other numbers of bits) may indicate the ul_carrier_id. Therefore, at least 4 bits (e.g., 3 bits of the f_id and/or 1 bit of the ul_carrier_id) may indicate/specify the one or more frequency domain resources.

For a 2-step random access procedure, a message B (MSGB) RNTI (MSGB-RNTI) may be associated with a PRACH occasion. The PRACH occasion may correspond to a PRACH occasion in which a random access preamble is transmitted. The wireless communication device and/or the wireless communication node may compute/calculate/determine the MSGB-RNTI using the following formula:

$$MSGB\text{-}RNTI = 1 + s\_id + 14 \times t\_id + 14 \times 80 \times f\_id + 14 \times 80 \times 8 \times ul\_carrier\_id + 14 \times 80 \times 8 \times 2$$

In some embodiments, the MSGB-RNTI may be a function of one or more parameters associated with the one or more time domain resources (e.g., s_id, t_id, and/or other time domain resource parameters) of the transmitting preamble (e.g., the MSGB-RNTI may exclude the frequency domain resource parameters). Therefore, the wireless communication device and/or the wireless communication node may compute/calculate/determine the MSGB-RNTI using the following formula:

$$MSGB\text{-}RNTI = 1 + s\_id + 14 \times t\_id + 14 \times \text{the maximum value of } t\_id$$

The value of the SCS may determine/influence the maximum value of the t_id. If the SCS has a value of 1,920 kHz, the maximum value of the MSGB-RNTI may correspond to 35,840 (or other numbers). At least 4 bits (e.g., 3 bits of the f_id and/or 1 bit of the ul_carrier_id) may indicate/specify the one or more frequency domain resources (e.g., similar to 4-step random access channel (RACH)).

I. Wireless Communication Node Side

In some embodiments, at least 1 bit may indicate/specify the ul_carrier_id where the preamble was received/obtained. At least 3 bits may indicate/provide the frequency domain resource(s) where the preamble was received. Therefore, the wireless communication node may send/provide/indicate at least 4 bits to the wireless communication device. The wireless communication node may use the DCI and/or RAR to provide the at least 4 bits.

II. Wireless Communication Device Side

For 4-Step Random Access Procedure

In some embodiments, a random access response may indicate a successful reception when one or more of a plurality of conditions are satisfied. The wireless communication device may detect/determine/identify a DCI format (e.g., DCI format 1_0 or other type and/or format of DCI). The plurality of conditions may include that a cyclic redundancy check (CRC) of the DCI format is scrambled with the RA-RNTI. The DCI and/or RAR may indicate/specify one or more frequency domain resources and/or UL carrier. The plurality of conditions may include that the indicated frequency domain resource(s) correspond to the frequency domain resource(s) where the wireless communication device transmitted a PRACH. The plurality of conditions may include that the indicated UL carrier corresponds to the UL carrier where the wireless communication device transmitted the PRACH. At least one of the plurality of conditions may include/be that a random access preamble identifier in a medium access control (MAC) protocol data unit (PDU) corresponds to a transmitted preamble index.

For 2-Step Random Access Procedure

In some embodiments, a random access response may indicate a successful reception when one or more conditions of a first set of conditions are satisfied. The wireless communication device may detect/determine/identify a DCI format (e.g., DCI format 1_0 or other type and/or format of DCI). At least one condition of the first set of conditions may be/include that a CRC of the DCI format is scrambled with the MSGB-RNTI. The DCI and/or RAR may indicate/specify one or more frequency domain resources and/or UL carrier. At least one condition of the first set of conditions may be/include that the indicated frequency domain resource(s) correspond to the frequency domain resource(s) where the wireless communication device transmitted a PRACH. At least one condition of the first set of conditions may be/include that the indicated UL carrier corresponds to the UL carrier where the wireless communication device transmitted a PRACH. In some embodiments, the MSGB (or MsgB) may include a fallbackRAR MAC sub-PDU (or other data unit or message). At least one condition of the first set of conditions may be/include that the fallbackRAR MAC sub-PDU corresponds to a transmitted preamble index (e.g., if included in the MAC PDU). At least one condition of the first set of conditions may be/include that a random access preamble identifier in a MAC PDU corresponds to the transmitted preamble index (e.g., if included in the MAC PDU).

In some embodiments, a random access response may indicate a successful reception when one or more conditions of a second set of conditions are satisfied. The wireless communication device may detect/determine/identify a DCI format (e.g., DCI format 1_0 or other type and/or format of DCI). At least one condition of the second set of conditions may be/include that a CRC of the DCI format is scrambled with the MSGB-RNTI. The DCI and/or RAR may indicate/specify one or more frequency domain resources and/or UL carrier. At least one condition of the second set of conditions may be/include that the indicated frequency domain resource(s) correspond to the frequency domain resource(s) where the wireless communication device transmitted a PRACH. At least one condition of the second set of conditions may be/include that the indicated UL carrier corresponds to the UL carrier where the wireless communication device transmitted a PRACH. At least one condition of the second set of conditions may be/include that the MSGB includes a successRAR MAC sub-PDU (or other data unit or message). At least one condition of the second set of conditions may be/include that a message A MSGA includes a common control channel (CCCH) service data unit (SDU). At least one condition of the second set of conditions may be/include that a user equipment (UE) contention resolution identity in a MAC sub-PDU matches/corresponds to the CCCH SDU.

B. Embodiment 2: The RNTI Indicates the Time Domain Resources, the DCI or RAR Indicate the Frequency Domain Resources, and the RO Index is Used as the t_id The operations and functionalities of the RA-RNTI may comprise any one or more of the components, operations and/or characteristics described in connection with the RA-RNTI of section A (Embodiment 1). The wireless communication device and/or the wireless communication node may compute/calculate/determine the RA-RNTI using the following formula:

$$RA\text{-}RNTI = 1 + s\_id + 14 \times t\_id + 14 \times 80 \times f\_id + 14 \times 80 \times 8 \times ul\_carrier\_id$$

In some embodiments, the RA-RNTI may be a function of one or more parameters associated with the one or more time domain resources (e.g., s_id, t_id, and/or other time domain resources) of the transmitting preamble (e.g., the RA-RNTI may exclude parameters associated with the frequency domain resources). The one or more parameters associated with the one or more time domain resources may include/comprise the RACH occasion (RO) index in a system frame (RO_index). The RA-RNTI formula may be a function of the RO_index (or other time domain indices). Therefore, the wireless communication device and/or the wireless communication node may compute/calculate/determine the RA-RNTI using the following formula:

$$RA\text{-}RNTI = 1 + t\_RO\_id$$

The t_RO_id may indicate/provide/specify/correspond to the index of a PRACH occasion in the domain (e.g., in a system frame). The t_RO_id may have a value that is greater than or equal to 0 and less than t_RO_total (e.g., $0 \leq t\_RO\_id \leq t\_RO\_total$). The t_RO_total may indicate/provide/specify/correspond to the total number of PRACH occasions in the time domain in a system frame. The t_RO_total may have a value that is greater than 0 and less than or equal to 70 (e.g., $0 \leq t\_RO\_total \leq 70$). The t_RO_id and/or the t_RO_total may be determined based on the PRACH configuration index (e.g., specified in Table 6.3.3.2-2~Table 6.3.3.2-4 in clause 6.3.3.2 in TS 38.211).

The wireless communication node may indicate/provide the one or more parameters associated with one or more frequency domain resources of the transmitting preamble (e.g., f_id, ul_carrier_id, and/or other frequency domain resource parameters) to the wireless communication device. The wireless communication node may use the RAR and/or DCI to indicate the one or more parameters associated with one or more frequency domain resources. In certain specifications, the f_id may have a maximum value of 7 (or other numbers). Therefore, at least 3 bits (or other numbers of bits) may indicate the f_id. In some embodiments, at least 2 uplink (UL) carriers may be configured for the UL carrier, and hence, at least 1 bit (or other numbers of bits) may indicate the ul_carrier_id. Therefore, at least 4 bits (e.g., 3 bits of the f_id and/or 1 bit of the ul_carrier_id) may indicate/specify the one or more frequency domain resources.

For a 2-step random access procedure, a MSGB-RNTI may be associated with a PRACH occasion. The PRACH occasion may correspond to a PRACH occasion in which a random access preamble is transmitted. The wireless communication device and/or the wireless communication node may compute/calculate/determine the MSGB-RNTI using the following formula:

$$MSGB\text{-}RNTI = 1 + s\_id + 14 \times t\_id + 14 \times 80 \times f\_id + 14 \times 80 \times 8 \times ul\_carrier\_id + 14 \times 80 \times 8 \times 2$$

In some embodiments, the MSGB-RNTI may be a function of the one or more parameters associated with the one or more time domain resources (e.g., s_id, t_id, t_RO_id, and/or other time domain resource parameters) of the transmitting preamble (e.g., the MSGB-RNTI may exclude the frequency domain resource parameters). Therefore, the wireless communication device and/or the wireless communication node may compute/calculate/determine the MSGB-RNTI using the following formula:

$$MSGB\text{-}RNTI = 1 + t\_RO\_id + t\_RO\_total$$

At least 4 bits (e.g., 3 bits of the f_id and/or 1 bit of the ul_carrier_id) may indicate/specify the one or more frequency domain resources.

In this embodiment (embodiment 2), the operations and functionalities of the wireless communication node may be performed by any one or more of the components and/or operations described in connection with subsection I (Wireless communication node side) of section A (Embodiment 1). In this embodiment (embodiment 2), the operations and functionalities of the wireless communication device may be performed by any one or more of the components and/or operations described in connection with subsection II (Wireless communication device side) of Section A (Embodiment 1).

C. Embodiment 3: The RNTI Indicates the Frequency Domain Resources, and the DCI or RAR Indicate the Time Domain Resources In certain implementations, the RA-RNTI may be associated/related to a PRACH occasion. The PRACH occasion may correspond to the PRACH occasion in which the random access preamble is transmitted. The wireless communication device and/or the wireless communication node may compute/calculate/determine the RA-RNTI using the following formula:

$$RA\text{-}RNTI = 1 + s\_id + 14 \times t\_id + 14 \times 80 \times f\_id + 14 \times 80 \times 8 \times ul\_carrier\_id$$

The RA-RNTI formula may include/comprise one or more parameters associated with one or more time domain resources of the transmitting preamble (e.g., s_id, t_id, and/or other time domain resource parameters). The RA- RNTI formula may include/comprise one or more parameters associated with one or more frequency domain resources of the transmitting preamble (e.g., f_id, ul_carrier_id, and/or other frequency domain resource parameters). The one or more time domain resources and the frequency domain resources (and/or their associated parameters) may be decoupled/separated to reduce/decrease/minimize the range of the RA-RNTI. In some embodiments, the formula that provides/indicates/specifies the value of the RA-RNTI may include one or more parameters associated with the one or more frequency domain resources. The formula that provides/indicates/specifies the value of the RA-RNTI may exclude parameter(s) associated with the one or more time domain resources. The wireless communication network may indicate/provide the parameter(s) associated with time domain resources to the wireless communication device. The wireless communication network may use the DCI and/or RAR (or other types of signaling and/or messages) to indicate the parameter(s) associated with time domain resources.

In some embodiments, the RA-RNTI may be a function of parameter(s) associated with the one or more frequency domain resources (e.g., f_id, ul_carrier_id, and/or other frequency domain resources) of the transmitting preamble (e.g., the RA-RNTI may exclude parameter(s) associated with the time domain resources). Therefore, the wireless communication device and/or the wireless communication node may compute/calculate/determine the RA-RNTI using the following formula:

$$RA\text{-}RNTI = 1 + f\_id + 8 \times ul\_carrier\_id$$

The previous formula may be unassociated/unrelated to the value of the SCS (e.g., the formula excludes the t_id). Therefore, the value of the RA-RNTI may range from 0 to 15 (or other numbers).

In some embodiments, the wireless communication node may indicate/provide/specify parameter(s) associated with the one or more time domain resources (e.g., the starting position of a symbol, the slot of the transmitting preamble, and/or other time domain resources) to the wireless communication device. The wireless communication node may indicate parameter(s) associated with the one or more time domain resources using the DCI and/or the RAR. At least 4 bits (or other numbers of bits) may indicate/provide the information of the symbol (e.g., the starting position of the symbol). If the SCS has a value of 1,920 kHz, at least 11 bits (or other numbers of bits) may indicate the information of the slot (e.g., the slot of the transmitting preamble). Therefore, if the SCS has a value of 1,920 kHz, at least 15 bits may be used to indicate the parameter(s) associated with the one or more time domain resources.

For a 2-step random access procedure, a MSGB-RNTI may be associated with a PRACH occasion. The PRACH occasion may correspond to a PRACH occasion in which a random access preamble is transmitted. The wireless communication device and/or the wireless communication node may compute/calculate/determine the MSGB-RNTI using the following formula:

$$MSGB\text{-}RNTI = 1 + s\_id + 14 \times t\_id + 14 \times 80 \times f\_id + 14 \times 80 \times 8 \times ul\_carrier\_id + 14 \times 80 \times 8 \times 2$$

In some embodiments, the MSGB-RNTI may be a function of parameter(s) for or associated with the one or more frequency domain resources (e.g., f_id, ul_carrier_id, and/or other frequency domain resource parameters) of the transmitting preamble (e.g., the MSGB-RNTI may exclude the time domain resources). Therefore, the wireless communication device and/or the wireless communication node may compute/calculate/determine the MSGB-RNTI using the following formula:

$$MSGB\text{-}RNTI = 1 + f\_id + 8 \times ul\_carrier\_id + 8 \times 2$$

At least 15 bits (e.g., 11 bits of the slot information and/or 4 bits of the symbol information) may indicate/specify the parameter(s) associated with the one or more time domain resources (e.g., similar to a 4-step random access procedure if the SCS has a value of 1,920 kHz).

I. Wireless Communication Node Side

In some embodiments, the wireless communication node may indicate/provide the one or more time domain resources (e.g., the position of the symbol, the slot where the preamble has been received, and/or other time domain resources) to the wireless communication device. The wireless communication node may indicate parameter(s) associated with the time domain resource(s) using the DCI and/or RAR. For example, if the SCS has a value of 1,920 kHz, at least 4 bits may indicate the position of the symbol. In the same example, at least 9 bits may indicate the slot where the preamble has been received. Therefore, the wireless communication node may provide the at least 13 bits to the wireless communication device using the DCI and/or RAR.

II. Wireless Communication Device Side

For 4-Step Random Access Procedure

In some embodiments, a random access response may indicate a successful reception when one or more of a plurality of conditions are satisfied. The wireless communication device may detect/determine/identify a DCI format (e.g., DCI format 1_0 or other type and/or format of DCI). At least one of the plurality of conditions may be/include that a CRC of the DCI format is scrambled with the RA-RNTI. The DCI and/or RAR may indicate/specify one or more time domain resources (e.g., position of a symbol, slot, and/or other resources). At least one of the plurality of conditions may be/include that the indicated position of the symbol corresponds to the position of the symbol where the wireless communication device transmitted a PRACH. At least one of the plurality of conditions may be/include that the indicated slot corresponds to the slot where the wireless communication device transmitted the PRACH. At least one of the plurality of conditions may be/include that a random access preamble identifier in a MAC PDU corresponds to a transmitted preamble index (e.g., if included in the MAC PDU).

For 2-Step Random Access Procedure

In some embodiments, a random access response may indicate a successful reception when one or more conditions of a first set of conditions are satisfied. The wireless communication device may detect/determine/identify a DCI format (e.g., DCI format 1_0 or other type and/or format of DCI). At least one condition of the first set of conditions may be/include that a CRC of the DCI format is scrambled with the MSGB-RNTI. The DCI and/or RAR may indicate/specify one or more time domain resources (e.g., position of a symbol, slot, and/or other resources). At least one condition of the first set of conditions may be/include that the indicated position of the symbol corresponds to the position of the symbol where the wireless communication device transmitted a PRACH. At least one condition of the first set of conditions may be/include that the indicated slot corresponds to the slot where the wireless communication device transmitted the PRACH. In some embodiments, the MSGB may include a fallbackRAR MAC sub-PDU (or other data unit or message). At least one condition of the first set of conditions may be/include that the fallbackRAR MAC sub- PDU corresponds to a transmitted preamble index (e.g., if included in the MAC PDU). At least one condition of the first set of conditions may be/include that a random access preamble identifier in a MAC PDU corresponds to the transmitted preamble index (e.g., if included in the MAC PDU).

In some embodiments, a random access response may indicate a successful reception when one or more conditions of a second set of conditions are satisfied. The wireless communication device may detect/determine/identify a DCI format (e.g., DCI format 1_0 or other type and/or format of DCI). At least one condition of the second set of conditions may be/include that a CRC of the DCI format is scrambled with the MSGB-RNTI. The DCI and/or RAR may indicate/specify one or more time domain resources (e.g., position of a symbol, slot, and/or other resources). At least one condition of the second set of conditions may be/include that the indicated position of the symbol corresponds to the position of the symbol where the wireless communication device transmitted a PRACH. At least one condition of the second set of conditions may be/include that the indicated slot corresponds to the slot where the wireless communication device transmitted the PRACH. At least one condition of the second set of conditions may be/include that the MSGB includes a successRAR MAC sub-PDU (or other parameter/setting). At least one condition of the second set of conditions may be/include that a MSGA includes a CCCH SDU. At least one condition of the second set of conditions may be/include that a UE contention resolution identity in a MAC sub-PDU matches/corresponds to the CCCH SDU.

D. Embodiment 4: The RNTI Indicates the Frequency Domain Resources, the DCI or RAR Indicate the Time Domain Resources, and the RO Index is Used as the t_id The operations and functionalities of the RA-RNTI may comprise any one or more of the components, operations and/or characteristics described in connection with the RA-RNTI of section C (Embodiment 3). The wireless communication device and/or the wireless communication node may compute/calculate/determine the RA-RNTI using the following formula:

$$RA\text{-}RNTI = 1 + s\_id + 14 \times t\_id + 14 \times 80 \times f\_id + 14 \times 80 \times 8 \times ul\_carrier\_id$$

In some embodiments, the RA-RNTI may be a function of the parameter(s) associated with one or more frequency domain resources (e.g., f_id, ul_carrier_id, and/or other frequency domain resource parameters) of the transmitting preamble (e.g., the RA-RNTI may exclude the time domain resource parameters). Therefore, the wireless communication device and/or the wireless communication node may compute/calculate/determine the RA-RNTI using the following formula:

$$RA\text{-}RNTI = 1 + f\_id + 8 \times ul\_carrier\_id$$

The previous formula may be unassociated/unrelated to the value of the SCS (e.g., the formula excludes the t_id). Therefore, the value of the RA-RNTI may range from 0 to 15 (or other numbers).

The parameter(s) associated with one or more time domain resources may include/comprise the t_RO_id. The operations and functionalities of the t_RO_id may comprise any one or more of the components, operations and/or characteristics described in connection with the t_RO_id of section B (Embodiment 2). The operations and functionalities of the t_RO_total may comprise any one or more of the components, operations and/or characteristics described in connection with the t_RO_total of section B (Embodiment 2). If t_RO_total has a value of 70, at least 7 bits (or other numbers of bits) may indicate/specify the t_RO_total. Therefore, at least 7 bits may indicate/specify the time domain resource(s) of the transmitting preamble.

For a 2-step random access procedure, a MSGB-RNTI may be associated with a PRACH occasion. The operations and functionalities of the MSGB-RNTI may comprise any one or more of the components, operations and/or characteristics described in connection with the MSGB-RNTI of section C (Embodiment 3).

The wireless communication device and/or the wireless communication node may compute/calculate/determine the MSGB-RNTI using the following formula:

$$MSGB\text{-}RNTI = 1 + f\_id + 8 \times ul\_carrier\_id + 8 \times 2$$

At least 7 bits (e.g., 7 bits of the t_RO_total) may indicate/specify the one or more time domain resources (e.g., similar to a 4-step random access procedure).

I. Wireless Communication Node Side

In some embodiments, the wireless communication node may indicate/provide the parameter(s) associated with one or more time domain resources (e.g., RO index in the time domain in a system frame) to the wireless communication device. The wireless communication node may indicate the parameter(s) associated with the time domain resource(s) using the DCI and/or RAR.

II. Wireless Communication Device Side

For 4-Step Random Access Procedure

In some embodiments, a random access response may indicate a successful reception when one or more of a plurality of conditions are satisfied. The wireless communication device may detect/determine/identify a DCI format (e.g., DCI format 1_0 or other type and/or format of DCI). At least one of the plurality of conditions may be/include that a CRC of the DCI format is scrambled with the RA-RNTI. The DCI and/or RAR may indicate/specify one or more time domain resources (e.g., RO index in the time domain in a system frame, and/or other resources). At least one of the plurality of conditions may be/include that the RO index corresponds to the symbol where the wireless communication device transmitted a PRACH. At least one of the plurality of conditions may be/include that the RO index corresponds to the slot where the wireless communication device transmitted the PRACH. At least one of the plurality of conditions may be/include that a random access preamble identifier in a MAC PDU corresponds to a transmitted preamble index (e.g., if included in the MAC PDU).

For 2-Step Random Access Procedure

In some embodiments, a random access response may indicate a successful reception when one or more conditions of a first set of conditions are satisfied. The wireless communication device may detect/determine/identify a DCI format (e.g., DCI format 1_0 or other type and/or format of DCI). At least one condition of the first set of conditions may be/include that a CRC of the DCI format is scrambled with the MSGB-RNTI. The DCI and/or RAR may indicate/specify one or more time domain resources (e.g., RO index in the time domain in a system frame, and/or other resources). At least one condition of the first set of conditions may be/include that the RO index corresponds to the symbol where the wireless communication device transmitted a PRACH. At least one condition of the first set of conditions may be/include that the RO index corresponds to the slot where the wireless communication device transmitted the PRACH. In some embodiments, the MSGB may include a fallbackRAR MAC sub-PDU (or other data unit or message). At least one condition of the first set of conditions may comprise that the fallbackRAR MAC sub-PDU corresponds to a transmitted preamble index (e.g., if included in the MAC PDU). At least one condition of the first set of conditions may be/include that a random access preamble identifier in a MAC PDU corresponds to the transmitted preamble index (e.g., if included in the MAC PDU).

In some embodiments, a random access response may indicate a successful reception when one or more conditions of a second set of conditions are satisfied. The wireless communication device may detect/determine/identify a DCI format (e.g., DCI format 1_0 or other type and/or format of DCI). At least one condition of the second set of conditions may be/include that a CRC of the DCI format is scrambled with the MSGB-RNTI. The DCI and/or RAR may indicate/specify one or more time domain resources (e.g., RO index in the time domain in a system frame, and/or other resources). At least one condition of the second set of conditions may be/include that the RO index corresponds to the symbol where the wireless communication device transmitted a PRACH. At least one condition of the second set of conditions may be/include that the RO index corresponds to the slot where the wireless communication device transmitted the PRACH. At least one condition of the second set of conditions may be/include that the MSGB includes a successRAR MAC sub-PDU (or other parameter/setting). At least one condition of the second set of conditions may be/include that a MSGA includes a CCCH SDU. At least one condition of the second set of conditions may be/include that a UE contention resolution identity in a MAC sub-PDU matches/corresponds to the CCCH SDU.

E. Embodiment 5: The Time Domain Symbol Index and the Slot Index Replaced by the PRACH Occasion Index t_RO_id In some embodiments, the formula that generates/determines/calculates the RNTI may be modified/changed to reduce/limit/maintain the range of the possible values of RNTI. Modifying the formula may result in a reduction of signaling overhead (e.g., for time and/or frequency domain indication). The wireless communication device and/or the wireless communication node may compute/calculate/determine the RA-RNTI using the following formula:

$$RA\text{-RNTI}=1+t\_RO\_id+t\_RO\_total \times f\_id+t\_RO\_total \times 8 \times ul\_carrier\_id$$

The wireless communication device and/or the wireless communication node may compute/calculate/determine the MSGB-RNTI using the following formula:

$$MSGB\text{-RNTI}=1+t\_RO\_id+t\_RO\_total \times f\_id+t\_RO\_total \times 8 \times ul\_carrier\_id+t\_RO\_total \times 8 \times 2$$

The operations and functionalities of the t_RO_id may comprise any one or more of the components, operations and/or characteristics described in connection with the t_RO_id of section B (Embodiment 2). The operations and functionalities of the t_RO_total may comprise any one or more of the components, operations and/or characteristics described in connection with the t_RO_total of section B (Embodiment 2). The f_id may correspond/refer to the index of the PRACH occasion in the frequency domain (e.g., $0 \leq f\_id \leq 8$). The ul_carrier_id may correspond/refer to the UL carrier used for random access preamble transmissions (e.g., 0 for NUL carrier and/or 1 for SUL carrier).

According to certain configurations (e.g., the PRACH configuration specified in TS 38.211), the maximum value of the t_RO_total may correspond to 70. Therefore, the maximum value of the RA-RNTI may correspond to 1,120 (e.g., 70×8×2). The maximum value of the MSGB-RNTI may correspond to 2,240 (e.g., 70×8×2×2). If the maximum SCS is increased/expanded/incremented to 1,920 kHz, the maximum value of the RA-RNTI may correspond to 17,920 (e.g., may be within the RNTI range (0, 65,535)). If the maximum SCS is increased/expanded/incremented to 1,920 kHz, the maximum value of the MSGB-RNTI may correspond to 35,840 (e.g., may be within the RNTI range (0, 65,535)).

Referring now to FIG. 3, depicted is a table 300 for random access configurations for frequency range 2 (FR2) and/or an unpaired spectrum. In some embodiments, the PRACH configuration index may be configured using table 300. For example, the PRACH configuration index may correspond to a value of 26 (or other numbers). The wireless communication device may select/identify the PRACH occasion located in symbol 4-5 in slot 31 in the time domain. According to table 300, there are 7 slots that include PRACH occasions prior to the slot that includes the target PRACH occasion (e.g., slots 3, 7, 11, 15, 19, 23, and 27). In some embodiments, there may be 2 PRACH occasions prior to symbol 4 in slot 31. Therefore, the t_RO_id may be calculated/computed as 7×6+2=44. The t_RO_id may be a function of the number of slots prior to the slot that includes the target PRACH occasion, the number of time domain PRACH occasions within a PRACH slot ($N_t^{RA,slot}$), and/or the number of PRACH occasions prior to the symbol that includes the target PRACH occasion. The t_RO_total may be calculated/computed as 10×6=60.

F. Embodiment 6: The DCI or RAR Indicate the Slot

In certain specifications, the RA-RNTI may be associated/related to a PRACH occasion. The PRACH occasion may correspond to the PRACH occasion in which the random access preamble is transmitted. The wireless communication device and/or the wireless communication node may compute/calculate/determine the RA-RNTI using the following formula:

$$RA\text{-RNTI}=1+s\_id+14 \times t\_id+14 \times 80 \times f\_id+14 \times 80 \times 8 \times ul\_carrier\_id$$

The s_id may correspond/refer to the index of the first OFDM symbol of the PRACH occasion (e.g., $0 \leq s\_id \leq 14$). The t_id may correspond/refer to the index of the first slot of the PRACH occasion in a system frame (e.g., $0 \leq t\_id \leq 80$) when the subcarrier spacing is smaller than or equal to 120 kHz (or other frequencies). In some embodiments, the t_id may correspond/refer to the index of the first slot of the PRACH occasion in a group of 80 slots (or 160 slots) when the subcarrier spacing is larger than 120 kHz (or other frequencies). A value of a parameter μ (e.g., specified in clause 5.3.2 in TS 38.211 [8]) may indicate/influence/determine a subcarrier spacing. The subcarrier spacing may determine/indicate/specify the value of t_id. The f_id may correspond/refer to the index of the PRACH occasion in the frequency domain (e.g., $0 \leq f\_id \leq 8$). The ul_carrier_id may correspond/refer to the UL carrier used for random access preamble transmissions (e.g., 0 for NUL carrier and/or 1 for SUL carrier).

Figure 4:
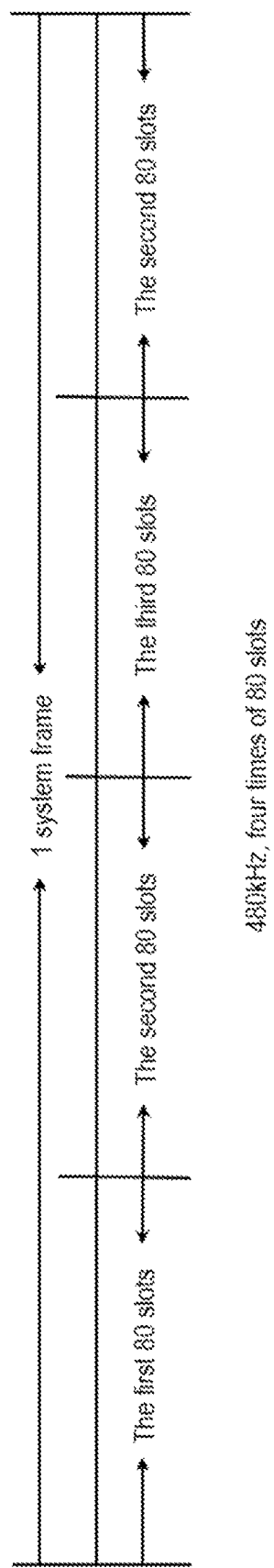
FIG. 4 illustrates an example system frame for communicating the radio network temporary identifier (RNTI), in accordance with some embodiments of the present disclosure.

Referring now to FIG. 4, depicted is a representation 400 of an example system frame for communicating the RNTI. In some embodiments, the value of the SCS may correspond to 120 kHz (or other frequencies). The value of 120 kHz may correspond to the maximum value of the SCS under certain standards/specifications. If the SCS has a value of 120 kHz, a number of slots may correspond to 80 (or other numbers). The number of slots (e.g., 80 slots or other numbers) may indicate/provide/specify a level of granularity of a system frame. The number of slots may correspond to one cycle/interval in a plurality of cycles/intervals. In some embodiments, the value of the SCS may be greater than 120 kHz. The value of the SCS may correspond to a multiple of 120 kHz. For example, the value of the SCS may correspond to 240 kHz. If the SCS has a value of 240 kHz (e.g., 120×2), the total number of slots in the system frame may correspond to 160 slots (e.g., 80×2). The total number of slots may correspond to a multiple of 80 slots. In another example, the value of the SCS may correspond to 1,920 kHz. If the SCS has a value of 1,920 kHz (e.g., 120×16), the total number of slots in the system frame may correspond to 1,280 slots (e.g., 80×16). As presented in FIG. 5, if the SCS has a value of 480 kHz (e.g., 120×4), the total number of slots in the system frame may correspond to 320 slots (e.g., 80×4). The level of granularity of the system frame may correspond to 80 slots (e.g., the first 80 slots, the second 80 slots, the third 80 slots, and the fourth 80 slots).

In some embodiments, the wireless communication device may indicate/specify the group of slots to which the RNTI belongs (e.g., the first 80 slots, the second 80 slots, and/or other groups of slots). If the SCS has a value of 480 kHz and there are four groups of 80 slots, at least 2 bits (or other numbers of bits) may indicate the group of slots to which the RNTI belongs. The wireless communication node may use the at least 2 bits to indicate the group of slots via DCI and/or RAR. If the SCS has a value of 1,920 kHz and there are 16 groups of 80 slots, at least 4 bits (or other numbers of bits) may indicate the group of slots to which the RNTI belongs.

I. Wireless Communication Node Side

The wireless communication node may receive/obtain the group(s) of 80 slots (or 160 slots) from the wireless communication device. The wireless communication device may send an indication to the wireless communication node. The indication may comprise an indication of a group of slots to which the RNTI belongs. The wireless communication device may send/transmit/broadcast the indication using the DCI and/or RAR. The wireless communication device may send the indication if the value of msg1-SubcarrierSpacing (or other parameters) is greater than 120 kHz (or other frequencies).

II. Wireless Communication Device Side

For 4-Step Random Access Procedure

In some embodiments, a random access response may indicate a successful reception when one or more of a plurality of conditions are satisfied. The wireless communication device may detect/determine/identify a DCI format (e.g., DCI format 1_0 or other type and/or format of DCI). At least one of the plurality of conditions may be/include that a CRC of the DCI format is scrambled with the RA-RNTI. The DCI and/or RAR may indicate/specify a group of 80 slots (or 160 slots). At least one of the plurality of conditions may be/include that the group of 80 slots (or 160 slots) corresponds to the symbol where the wireless communication device transmitted a PRACH. At least one of the plurality of conditions may be/include that the group of 80 slots (or 160 slots) corresponds to the slot where the wireless communication device transmitted the PRACH. At least one of the plurality of conditions may be/include that a random access preamble identifier in a MAC PDU corresponds to a transmitted preamble index (e.g., if included in the MAC PDU).

For 2-Step Random Access Procedure

In some embodiments, a random access response may indicate a successful reception when one or more conditions of a first set of conditions are satisfied. The wireless communication device may detect/determine/identify a DCI format (e.g., DCI format 1_0 or other type and/or format of DCI). At least one condition of the first set of conditions may be/include that a CRC of the DCI format is scrambled with the MSGB-RNTI. The DCI and/or RAR may indicate/specify a group of 80 (or 160 slots). At least one condition of the first set of conditions may be/include that the group of 80 slots (or 160 slots) corresponds to the symbol where the wireless communication device transmitted a PRACH. At least one condition of the first set of conditions may be/include that the group of 80 slots (or 160 slots) corresponds to the slot where the wireless communication device transmitted the PRACH. In some embodiments, the MSGB may include a fallbackRAR MAC sub-PDU (or other data unit of message). At least one condition of the first set of conditions may comprise that the fallbackRAR MAC sub-PDU corresponds to a transmitted preamble index (e.g., if included in the MAC PDU). At least one condition of the first set of conditions may comprise that a random access preamble identifier in a MAC PDU corresponds to the transmitted preamble index (e.g., if included in the MAC PDU).

In some embodiments, a random access response may indicate a successful reception when one or more conditions of a second set of conditions are satisfied. The wireless communication device may detect/determine/identify a DCI format (e.g., DCI format 1_0 or other type and/or format of DCI). At least one condition of the second set of conditions may be/include that a CRC of the DCI format is scrambled with the MSGB-RNTI. The DCI and/or RAR may indicate/specify a group of 80 slots (or 160 slots). At least one condition of the second set of conditions may be/include that the group of 80 slots (or 160 slots) corresponds to the symbol where the wireless communication device transmitted a PRACH. At least one condition of the second set of conditions may be/include that group of 80 slots (or 160 slots) corresponds to the slot where the wireless communication device transmitted the PRACH. At least one condition of the second set of conditions may be/include that the MSGB includes a successRAR MAC sub-PDU (or other parameter/setting). At least one condition of the second set of conditions may be/include that a MSGA includes a CCCH SDU. At least one condition of the second set of conditions may be/include that a UE contention resolution identity in a MAC sub-PDU matches/corresponds to the CCCH SDU.

G. Embodiment 7: The Extended t_id and the Slot Indicated by the DCI or RAR

The operations and functionalities of the RA-RNTI may comprise any one or more of the components, operations and/or characteristics described in connection with the RA-RNTI of section F (Embodiment 6). The wireless communication device and/or the wireless communication node may compute/calculate/determine the RA-RNTI using the following formula:

$$RA\text{-}RNTI = 1 + s\_id + 14 \times t\_id + 14 \times 80 \times f\_id + 14 \times 80 \times 8 \times ul\_carrier\_id$$

If the SCS has a value of 120 kHz, the maximum value of the t_id may correspond to 79. If the SCS has a value of 120 kHz, the maximum value of the RA-RNTI may correspond to 17,920. If the SCS has a value of 240 kHz, the maximum value of the t_id may correspond to 159. If the SCS has a value of 240 kHz, the maximum value of the RA-RNTI may correspond to 35,840. Therefore, if the SCS has a value of 240 kHz, the maximum value of the RA-RNTI (e.g., 35,840) may be within the bounds of the RA-RNTI (e.g., 0≤RA-RNTI≤65,535). In some embodiments, the t_id may be increased/incremented/extended to a value of 160 (or other numbers).

If the t_id is extended to 160, the number of slots in a group may correspond to 160 slots (e.g., the level of granularity may correspond to 160 slots). For a SCS with a value of 480 kHz, the total number of slots may correspond to 320 slots (e.g., 160×2). In another example, for a SCS with a value of 1,920 kHz, the total number of slots may correspond to 1,280 slots (e.g., 160×8). In this example, at least 3 bits (or other numbers of bits) may indicate/specify the group of 160 slots to which the RA-RNTI belongs. The DCI and/or RAR may indicate/specify the group of 160 slots to which the RA-RNTI belongs.

In this embodiment (embodiment 7), the operations and functionalities of the wireless communication node may be performed by any one or more of the components and/or operations described in connection with subsection I (Wireless communication node side) of section F (Embodiment 6). In this embodiment (embodiment 7), the operations and functionalities of the wireless communication device may be performed by any one or more of the components and/or operations described in connection with subsection II (Wireless communication device side) of Section F (Embodiment 6).

H. Methods Related to Radio Network Temporary Identifier (RNTI)

Figure 5:
FIG. 5 illustrates a flow diagram of an example method for determining a RNTI, in accordance with an embodiment of the present disclosure.

FIG. 5 illustrates a flow diagram of a method 550 related to a radio network identifier (RNTI). The method 550 may be implemented using any of the components and devices detailed herein in conjunction with FIGS. 1-4. In overview, the method 550 may include determining a RNTI (552). The method 550 may include determining a cyclic redundancy check (CRC) is scrambled with the RNTI (554).

Referring now to operation (552), and in some embodiments, a wireless communication device may determine/calculate a RNTI (e.g., RA-RNTI, MSGB-RNTI, and or other types/formats of RNTIs). In some embodiments, the wireless communication node may determine/calculate the RNTI. In some embodiments, the wireless communication device may receive/obtain an indication from a wireless communication node. The wireless communication node may send/transmit/broadcast the indication via a message (e.g., RAR, DCI, and/or other messages). The indication may comprise/include/provide/specify an index of a physical random access channel (PRACH) occasion in frequency domain (f_id). The indication may comprise/include/provide/specify an identifier of a carrier for random access preamble transmission (ul_carrier_id). The f_id and/or the ul_carrier_id may correspond to parameter(s) for or associated with one or more frequency domain resources of a transmitting preamble. In some embodiments, the wireless communication device and/or the wireless communication node may determine/calculate the RNTI. The RNTI may be a function of one or more indices. The one or more indices may comprise an index of a first orthogonal frequency division multiplexing (OFDM) symbol of the PRACH occasion (s_id) and/or other indices. The one or more indices may comprise an index of a first slot of the PRACH occasion (t_id). The wireless communication device and/or the wireless communication node may use the one or more indices (e.g., s_id and/or t_id) to determine/calculate the RNTI. In some embodiments, the RNTI may exclude parameter(s) of one or more frequency domain resources (e.g., the f_id, the ul_carrier_id, and/or other frequency domain resource parameters).

In some embodiments, the wireless communication device may receive/obtain an indication from a wireless communication node. The wireless communication node may send/transmit/broadcast the indication via a message (e.g., RAR, DCI, and/or other messages). The indication may comprise/include/provide/specify an index of a PRACH occasion in frequency domain (f_id). The indication may comprise/include/provide/specify an identifier of a carrier for random access preamble transmission (ul_carrier_id). The f_id and/or the ul_carrier_id may correspond to parameter(s) of one or more frequency domain resources of a transmitting preamble. In some embodiments, the wireless communication device and/or the wireless communication node may determine/calculate the RNTI. The RNTI may be a function of one or more indices. The one or more indices may comprise an index of the PRACH occasion in time domain (t_RO_id) and/or other indices. The wireless communication device and/or the wireless communication node may use the one or more indices (e.g., t_RO_id and/or other indices) to determine/calculate the RNTI. In some embodiments, the RNTI may exclude parameter(s) of one or more frequency domain resources (e.g., the f_id, the ul_carrier_id, and/or other frequency domain resource parameters).

In some embodiments, the wireless communication device may receive/obtain an indication from a wireless communication node. The wireless communication node may send/transmit/broadcast the indication via a message (e.g., RAR, DCI, and/or other messages). The indication may comprise/include/provide/specify an index of a first OFDM symbol of the PRACH occasion (s_id). The indication may comprise/include/provide/specify an index of a first slot of the PRACH occasion (t_id). The s_id and/or the t_id may correspond to parameter(s) of one or more time domain resources of a transmitting preamble. In some embodiments, the wireless communication device and/or the wireless communication node may determine/calculate the RNTI. The RNTI may be a function of one or more indices and/or one or more identifiers. The one or more indices may comprise an index of a PRACH occasion in frequency domain (f_id) and/or other indices. The one or more identifiers may comprise an identifier of a carrier for random access preamble transmission (ul_carrier_id) and/or other identifiers. The wireless communication device and/or the wireless communication node may use the one or more indices (e.g., f_id and/or other indices) and/or one or more identifiers (e.g., ul_carrier_id and/or other identifiers) to determine/calculate the RNTI. In some embodiments, the RNTI may exclude parameter(s) for or associated with one or more time domain resources (e.g., the s_id, the t_id, and/or other time domain resource parameters).

In some embodiments, the wireless communication device may receive/obtain an indication from a wireless communication node. The wireless communication node may send/transmit/broadcast the indication via a message (e.g., RAR, DCI, and/or other messages). The indication may comprise/include/provide/specify of an index of a PRACH occasion in time domain (t_RO_id). The t_RO_id may correspond to a parameter associated with one or more time domain resources of a transmitting preamble. In some embodiments, the wireless communication device and/or the wireless communication node may determine/calculate the RNTI. The RNTI may be a function of one or more indices and/or one or more identifiers. The one or more indices may comprise an index of a PRACH occasion in frequency domain (f_id) and/or other indices. The one or more identifiers may comprise an identifier of a carrier for random access preamble transmission (ul_carrier_id) and/or other identifiers. The wireless communication device and/or the wireless communication node may use the one or more indices (e.g., f_id and/or other indices) and/or one or more identifiers (e.g., ul_carrier_id and/or other identifiers) to determine/calculate the RNTI. In some embodiments, the RNTI may exclude parameter(s) associated with the one or more time domain resources (e.g., the t_RO_id, and/or other time domain resources).

In some embodiments, the wireless communication device and/or the wireless communication node may determine the RNTI. The RNTI may be a function of one or more indices, one or more numbers, and/or one or more identifiers. The one or more indices may comprise an index of a PRACH occasion in frequency domain (f_id) and/or other indices. The one or more indices may comprise an index of a PRACH occasion in time domain (t_RO_id). The one or more numbers may comprise a total number of PRACH occasions in the time domain (t_RO_total). The one or more identifiers may comprise an identifier of a carrier for random access preamble transmission (ul_carrier_id) and/or other identifiers. The wireless communication device and/or the wireless communication node may use the one or more indices (e.g., f_id, t_RO_id, and/or other indices), one or more numbers (e.g., t_RO_total), and/or one or more identifiers (e.g., ul_carrier_id and/or other identifiers) to determine/calculate the RNTI.

In some embodiments, the wireless communication device and/or the wireless communication node may determine the RNTI. The RNTI may be a function of one or more indices and/or one or more identifiers. The one or more indices may comprise an indication of an index of a first OFDM symbol of the PRACH occasion (s_id) and/or other indices. The one or more indices may comprise an index of a first slot of the PRACH occasion (t_id). In some embodiments, the value of the t_id may be extended/incremented/increased (e.g., from 79 to 159). The s_id and/or the t_id may correspond to parameter(s) for or associated with one or more time domain resources of a transmitting preamble. The one or more indices may comprise an index of a physical random access channel (PRACH) occasion in frequency domain (f_id). The one or more identifiers may comprise an identifier of a carrier for random access preamble transmission (ul_carrier_id) and/or other identifiers. In some embodiments, the wireless communication device may send/transmit/broadcast an indication of a group of slots (e.g., group of 80 slots and/or 160 slots) to which the RNTI belongs, to the wireless communication node. The wireless communication node may receive/obtain the indication via a message (e.g., DCI, RAR, and/or other messages).

Referring now to operation (554), and in some embodiments, the wireless communication device may determine that a CRC of a DCI format (e.g., DCI format 0 and/or other types/formats of DCIs) is scrambled with the RNTI. A random access response may indicate/inform/confirm a successful (or unsuccessful) reception (e.g., reception of a MAC RAR). The random access response may indicate a successful reception when the CRC is scrambled/mixed with the RNTI (e.g., with a value of RNTI that is the same as the value of RNTI that is independently determined/calculated by the wireless communication device). In some embodiments, a medium access control (MAC) protocol data unit (PDU) may include/provide/indicate a random access preamble identifier. The random access response may indicate a successful reception when the random access preamble identifier corresponds to a transmitted preamble index. In some embodiments, a MAC sub-PDU may include/provide/indicate a user equipment (UE) contention resolution identity. The random access response may indicate a successful reception when the UE contention resolution identity matches/corresponds to a common control channel (CCCH) service data unit (SDU).

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according to embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method comprising:
determining, by a wireless communication device, a radio network temporary identifier (RNTI) according to an index of a physical random access channel (PRACH) occasion in time domain in which a PRACH preamble is transmitted, wherein the RNTI is determined as a function of t_RO_id, where t_RO_id is the index of PRACH occasion in time domain and has a value which is less than a total number of PRACH occasions in time domain, wherein RNTI is determined according to at least one of:

RNTI=1+t_RO_id,

RNTI=1+t_RO_id+t_RO_total, where t_RO_total is the total number of PRACH occasions in time domain,
RNTI=1+t_RO_id+t_RO_total×f_id+t_RO_total×8× ul_carrier_id, where f_id is an index of the PRACH occasion in frequency domain and ul_carrier_id is an identifier of a carrier for random access preamble transmission, or
RNTI=1+t_RO_id+t_RO_total×f_id+t_RO_total×8× ul_carrier_id+t_RO_total×8× 2; and
detecting, by the wireless communication device, a downlink control information (DCI) format with a cyclic redundancy check (CRC) scrambled with the RNTI.

2. The method of claim 1, wherein a random access response indicates a successful reception when:
the CRC of the DCI format is scrambled with the RNTI; and
either a random access preamble identifier in a medium access control (MAC) protocol data unit (PDU) if included, corresponds to a transmitted preamble index, or
a user equipment (UE) contention resolution identity in a MAC sub-PDU matches a common control channel (CCCH) service data unit (SDU).

3. The method of claim 1, comprising:
receiving, by the wireless communication device from a wireless communication node via a message, an indication of the f_id corresponding to an index of the PRACH occasion in frequency domain, wherein the message is in a random access response (RAR) or the DCI.

4. The method of claim 1, wherein the RNTI comprises a random access (RA)-RNTI or a MsgB-RNTI.

5. A method comprising:
receiving, by a wireless communication node from a wireless communication device, a physical random access channel (PRACH) preamble;
determining, by the wireless communication node, a radio network temporary identifier (RNTI) as a function of an index of a PRACH occasion in time domain in which the PRACH preamble is received, wherein the RNTI is determined as a function of t_RO_id, where t_RO_id is the index of the PRACH occasion in time domain and has a value which is less than a total number of PRACH occasions in time domain, wherein RNTI is determined according to at least one of:

RNTI=1+t_RO_id,

RNTI=1+t_RO_id+t_RO_total, where t_RO_total is the total number of PRACH occasions in time domain, RNTI=1+t_RO_id+t_RO_total×f_id+t_RO_total×8× ul_carrier_id, where f_id is an index of the PRACH occasion in frequency domain and ul_carrier_id is an identifier of a carrier for random access preamble transmission, or
RNTI=1+t_RO_id+t_RO_total×f_id+t_RO_total×8× ul_carrier_id+t_RO_total×8× 2, transmitting, by the wireless communication node to the wireless communication device, a downlink control information (DCI) format with a cyclic redundancy check (CRC) scrambled with the RNTI.

6. The method of claim 5, wherein a random access response indicates a successful reception when:
the CRC of the DCI format is scrambled with the RNTI; and
either a random access preamble identifier in a medium access control (MAC) protocol data unit (PDU) if included, corresponds to a transmitted preamble index, or
a user equipment (UE) contention resolution identity in a MAC sub-PDU matches a common control channel (CCCH) service data unit (SDU).

7. The method of claim 5, comprising:
sending, by the wireless communication node to the wireless communication device via a message, an indication of the f_id corresponding to an index of a PRACH occasion in frequency domain, wherein the message is in a random access response (RAR) or the DCI.

8. The method of claim 5, wherein the RNTI comprises a random access (RA)-RNTI or a MsgB-RNTI.

9. A wireless communication device comprising:
at least one processor configured to:
determine a radio network temporary identifier (RNTI) according to an index of a physical random access channel (PRACH) occasion in time domain in which a PRACH preamble is transmitted, wherein the RNTI is determined as a function of t_RO_id, where t_RO_id is the index of PRACH occasion in time domain and has a value which is less than a total number of PRACH occasions in time domain, wherein RNTI is determined according to at least one of:

RNTI=1+$t\_RO\_id$,

RNTI=1+t_RO_id+t_RO_total, where t_RO_total is the total number of PRACH occasions in time domain,
RNTI=1++RO_id+t_RO_total×f_id+t_RO_total×8× ul_carrier_id, where f_id is an index of the PRACH occasion in frequency domain and ul_carrier_id is an identifier of a carrier for random access preamble transmission, or
RNTI=1+t_RO_id+t_RO_total×f_id+t_RO_total×8× ul_carrier_id+t_RO_total×8× 2; and detect a downlink control information (DCI) format with a cyclic redundancy check (CRC) scrambled with the RNTI.

10. The wireless communication device of claim 9, wherein a random access response indicates a successful reception when:
the CRC of the DCI format is scrambled with the RNTI; and
either a random access preamble identifier in a medium access control (MAC) protocol data unit (PDU) if included, corresponds to a transmitted preamble index, or
a user equipment (UE) contention resolution identity in a MAC sub-PDU matches a common control channel (CCCH) service data unit (SDU).

11. The wireless communication device of claim 9, wherein the RNTI comprises a random access (RA)-RNTI or a MsgB-RNTI.

12. The wireless communication device of claim 9, wherein the at least one processor is configured to receive, from the wireless communication node, via a message, an indication of the f_id corresponding to an index of a PRACH occasion in frequency domain, wherein the message is in a random access response (RAR) or the DCI.

13. A wireless communication node comprising:
at least one processor configured to:
receive, from a wireless communication device, a physical random access channel (PRACH) preamble;
determine a radio network temporary identifier (RNTI) as a function of an index of a PRACH occasion in time domain in which the PRACH preamble is received, wherein the RNTI is determined as a function of t_RO_id, where t_RO_id is the index of the PRACH occasion in time domain and has a value which is less than a total number of PRACH occasions in time domain, wherein RNTI is determined according to at least one of:

RNTI=1+$t\_RO\_id$,

RNTI=1+t_RO_id+t_RO_total, where t_RO_total is the total number of PRACH occasions in time domain,
RNTI=1+t_RO_id+t_RO_total×f_id+t_RO_total×8×ul_carrier_id, where f_id is an index of the PRACH occasion in frequency domain and ul_carrier_id is an identifier of a carrier for random access preamble transmission, or
RNTI=1+t_RO_id+t_RO_total×f_id+t_RO_total×8×ul_carrier_id+t_RO_total×8× 2; and transmit, to the wireless communication device a downlink control information (DCI) format with a cyclic redundancy check (CRC) scrambled with the RNTI.

14. The wireless communication node of claim 13, wherein a random access response indicates a successful reception when:
the CRC of the DCI format is scrambled with the RNTI; and
either a random access preamble identifier in a medium access control (MAC) protocol data unit (PDU) if included, corresponds to a transmitted preamble index, or
a user equipment (UE) contention resolution identity in a MAC sub-PDU matches a common control channel (CCCH) service data unit (SDU).

15. The wireless communication node of claim 13, wherein the RNTI comprises a random access (RA)-RNTI or a MsgB-RNTI.

16. The wireless communication device of claim 13, wherein the at least one processor is configured to transmit, to the wireless communication device, via a message, an indication of the f_id corresponding to an index of a PRACH occasion in frequency domain, wherein the message is in a random access response (RAR) or the DCI.

* * * * *